Dec. 31, 1957  G. STAVIS  2,818,501
MICROWAVE DUPLEXER
Filed July 6, 1955
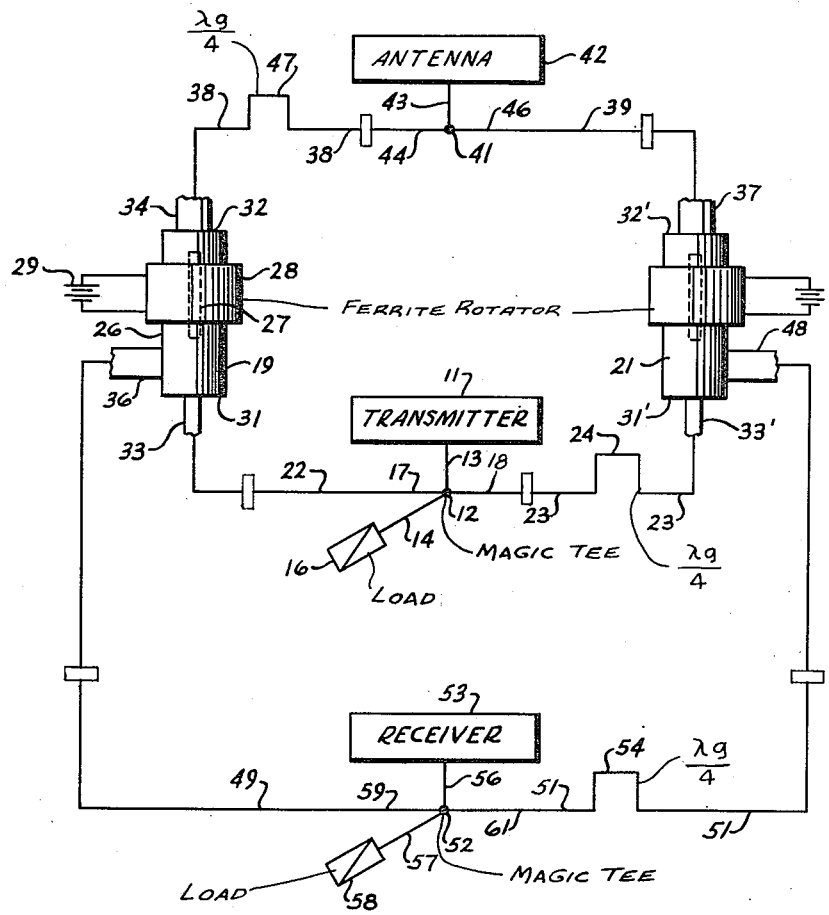
INVENTOR.
GUS STAVIS
BY
ATTORNEY United States Patent Office 2,818,501
Patented Dec. 31, 1957

2,818,501

MICROWAVE DUPLEXER

Gus Stavis, Ossining, N. Y., assignor to General Precision Laboratory Incorporated, a corporation of New York Application July 6, 1955, Serial No. 520,338

5 Claims. (Cl. 250—13)

This invention relates to a true microwave duplex circuit for simultaneous transmission and reception. More particularly the invention relates to a low-loss linear balanced duplex circuit.

The microwave duplexer most commonly used today in radar, radio or other operation employs transmit-receive (TR) tubes and operates only with relatively high-power pulse transmitters. It does not permit simultaneous transmission and reception and is therefore not a true duplexer. A type which is a true duplexer employs a hybrid four-terminal waveguide junction and a dissipative load. This type is employable in continuous-wave (C. W.) transmission circuits but inherently inserts 3 db losses in both the transmitting and receiving branches. A third type of duplexer employs one or more magnetic rotators. This latter type has the advantage that it is a true duplexer usable with low-power pulse transmission and with C. W. transmission. It also has the advantage that there is no inherent 6 db loss and a dissipative resistance is not required. An example of such magnetic rotation duplexer is described in Patent No. 2,644,930 issued July 7, 1953, on an invention of C. H. Luhrs.

The present invention provides a balanced circuit employing two magnetic rotation duplexing devices for true duplex operation of a transmitter and a receiver in conjunction with an antenna, microwave line, or another type of cooperating or reflecting load or device. The circuit provides greater isolation of the receiver from the transmitter than is provided by previously available circuits employing magnetic rotators, and in addition the circuit provides isolation of the transmitter from the receiver not heretofore obtained by previous circuits. This added type of isolation is desirable to prevent "pulling" of the transmitter frequency by local oscillator energy of slightly differing frequency.

The purpose of this invention is to provide an improved microwave duplexer depending for its operation on the use of a microwave field rotator of the magnetic type.

A further understanding of this invention may be secured from the detailed description and the drawing, the single figure of which is a schematic diagram of the circuit of the invention.

Referring now to the drawing, a microwave transmitter 11 which may contain, for example, a magnetron microwave generator, is connected to a hybrid four-terminal junction 12 which may be, for example, a magic tee. The transmitter is connected to the H-plane or shunt arm 13 of the magic tee 12, and the E-plane or series arm 14 is connected to a dissipative load 16. The other two or collinear arms 17 and 18 are connected to two similar magnetic rotator devices 19 and 21. These connections are made through two conductors 22 and 23, which are, for example, similar hollow rectangular microwave guides and which are unequal in length, one being longer than the other by an odd integral multiple of one-quarter wavelength in guide, or $$\frac{(2N+1)\lambda_g}{4}$$

in which N is any integer including zero and $\lambda_g$ is the wavelength in the rectangular guide. This inequity in length is schematically represented by the loop 24, and is positioned in the guide 23 to connected rotator 21.

The magnetic rotator devices 19 and 21 are similar to the device described in the Luhrs patent supra. Briefly, referring to rotator 19, a round guide 26 closed at both ends contains a ferrite element having the property, when magnetized, of rotating a microwave field passing through the guide. The ferrite element schematically indicated by the dashed rod 27 is magnetized by a surrounding solenoid 28 energized from a battery 29. The amount of rotation is independent of microwave field strength and is dependent upon several factors including the size and energization of the solenoid. This amount of rotation is made to be exactly 45° and is in such sense that microwave energy entering the round guide at its end 31 and passing to end 32 is rotated clockwise as seen by an observer at end 31. As is well known, energy passing in the reverse direction, from end 32 to end 31, is also rotated clockwise as seen by the observer at end 31. The round guide end 31 is provided with a matched transition to a rectangular guide 33 and end 32 is provided with a matched transition to a rectangular guide 34 which is fixed at a clockwise rotational angle of 45° relative to guide 33. A side arm guide 36 is positioned a distance of $$\frac{(2N+1)\lambda_g}{4}$$

from end 31 and is oriented relative to guide 33 so that a $TE_{11}$ field within the round guide polarized to excite one will not excite the other. The symbol $\lambda_g$ here represents the effective wavelength within the round guide 26.

The end guide arm 34 of rotator 19 and the corresponding arm 37 of rotator 21 are connected through similar guide conductors 38 and 39 and a shunt or H-plane tee 41 to an antenna or space radiator 42, the tee arm 43 being the shunt arm and the other two arms 44 and 46 being the collinear arms. The two guides 38 and 39 are similar except that arm 38 is longer by $$\frac{(2N+1)\lambda_g}{4}+M\lambda_g$$

the additional length being schematically indicated by loop 47. In this case N must have the same value as in loop 24. M may be any integer including zero.

The side arm 36 of rotator 19 and the corresponding side arm 48 of rotator 21 are connected by guide conductors 49 and 51 and a magic tee 52 to a microwave receiver 53, the guide 51 being longer than guide 49 by $$\frac{(2N+1)\lambda_g}{4}+P\lambda_g$$

represented by loop 54, N having the same value as allotted to it in loops 24 and 47. P may be any integer including zero. The H-plane or shunt arm 56 of magic tee 52 is connected to receiver 53 and the E-plane or series arm 57 is connected to a dissipative load 58. The collinear arms 59 and 61 are connected to guides 49 and 51 respectively.

The operation of this circuit depends upon the isolation achievable with magnetic rotators combined with additional isolation due to the use of tuned conductors. The latter depends upon the use of shunt or series arms of tees and magic tees which respectively require in-phase and anti-phase feeds from the collinear arms. The arms of the magic tees are so arranged that energy passes to the connected apparatus when of appropriate phase sense, but passes to the dissipative resistance when of the opposite phase sense. Connections are so made that energies passing through undesired coupling paths reach the resistances and are dissipated, thus providing very high isolation of the several components from undesired energy inputs.

In operation of this circuit as, for example, a C. W. radar duplexer, energy continuously generated by transmitter 11 is transmitted in phase to guides 22 and 23, and is applied to end guide entrances 33 and 33' of rotators 19 and 21. In each the resulting $TE_{11}$ field cannot affect side arms 36 and 48 since the field polarity differs by exactly 90° from that necessary for exact registration with these arms. These fields, as they pass through the rotator, are rotated clockwise by 45° so that they excite the output arms 34 and 37. The output arm energies are transmitted through guides 38 and 39 to T 41. Since length of guide 23 including loop 24 plus that of guide 39 equals the length of guide 22 plus that of guide 38 including loop 47, the two energies arrive at T41 in phase. They therefore combine to excite the shunt arm 43 and through it antenna 42.

Echo energy received by antenna 42 excites the collinear arms 44 and 46 of shunt T 41 in phase. These energies are applied through end guides 34 and 37 to rotators 19 and 21, and in passing through are rotated by 45°, so that they are oriented to excite side arms 36 and 48 while not exciting end arms 33 and 33'. The energies therefore pass through guide arms 49 and 51 to magic T 52. They arrive in phase because the length of guide 38 plus loop 47 and guide 49 equals the length of guide 39 added to guide 51 plus loop 54 plus $(M-P)\lambda_g$. The energies being in phase, they enter shunt arm 56 and are received by receiver 53. None of the energy enters the series dissipative arm 57.

The isolations achieved in the rotators 19 and 21 are high but not perfect. Some energy from transmitter 11 leaks out the side arms 36 and 48. This energy leakage is, however, further attenuated by the antiphase tuning of the guide conductors. One path from transmitter 11 to receiver 53 is through guides 22 and 49, and the other path is through guides 23 and 51, the latter path being longer than the first path by an odd number of one-half wavelengths. The two energies therefore reach magic T 52 in phase opposition and do not pass through shunt arm 56 to the receiver but pass through series arm 57 to the dissipative trap 58, where they are non-reflectively absorbed and their energy is dissipated.

It has been found that some local oscillator energy reaches the rotators from the receiver. This energy then passes through the rotators, is rotated and reaches the ends 32 and 32' with such polarization that it cannot pass out the end arm but is reflected from these ends back into the rotators. These energies are again rotated and reach ends 31 and 31' in such orientation as to enter the transmitter arms 33 and 33'. They then pass toward the transmitter. This energy is, however, prevented from interfering with transmitter operation because it arrives by two paths, one including guides 49 and 22 and the other including guides 51 and 23. As the latter path contains loops 54 and 24 and is an odd number $g$ one-half wavelengths longer than the former, the energies arrive at magic T 12 in phase opposition and instead of entering the transmitter through shunt arm 13 enter the resistor 16 through series arm 14, where they are dissipated.

Side arm 43 of the T 41 connected to the antenna 42 and the magic T arms 13 and 56 connected to the transmitter and receiver need not be shunt arms as described but any or all of them may be series arms, with appropriate changes in the locations of the guide loops 47, 24 and 54 to preserve the operational paths and the isolations described, all of the variations so formed being operative. The shunt arms are, however preferred because they are somewhat more easily matched for broadband operation. The two operative paths are as described, from transmitter to antenna and from antenna to receiver; the two high-isolation paths are from transmitter to receiver and from receiver to transmitter.

What is claimed is:
1. A microwave duplexer comprising, a pair of microwave unidirectional coupling means each of which transmits energy therethrough in one path in one direction and through another path in the other direction, an antenna, a first pair of guided circuits coupling said antenna to each of said unidirectional coupling means, a transmitter, a second pair of guided circuits coupling said transmitter to said one path of each of said unidirectional coupling means, a receiver, a third pair of guided circuits coupling said receiver to said other path of each of said unidirectional coupling means, one of each of said pair of guided circuits differing in length from the other of the respective pair by an odd integral number of quarter wavelengths in the guide.

2. A microwave duplexer comprising, a pair of microwave unidirectional coupling means each of which transmits energy therethrough in one path in one direction and through another path in the other direction, an antenna, a first pair of guided circuits coupling said antenna to each of said unidirectional coupling means, a transmitter connected to one arm of a hybrid junction, a second pair of guided circuits each having one end terminal connected to a respective electrically adjacent arm of said hybrid junction and their other end terminals connected to a respective one path of said unidirectional coupling means, a receiver connected to one arm of a second hybrid junction, a third pair of guided circuits each having one end terminal connected to a respective electrically adjacent arm of said second hybrid junction and their other end terminals connected to a respective other path of said unidirectional coupling means, one of each of said pair of guided circuits differing in length from the other of the respective pair by an odd integral number of quarter wavelengths in the guide.

3. A microwave duplexer comprising, a microwave transmitter, a hybrid junction having four terminals, one terminal being connected to said transmitter and the conjugate terminal being connected to a dissipative load, a pair of magnetic rotators, two microwave guide paths connecting the two remaining terminals of said hybrid junction to said pair of rotators, said paths differing in length by an odd integral multiple of one-quarter wavelength in guide, a microwave load, a three-terminal junction connected thereto, two load paths connecting said rotators to said three-terminal junction, said rotators being conductive for microwave energy passing from said transmitter to said load, said load paths differing in length by an odd integral multiple of one-quarter wavelength in guide, a microwave receiver, a second hybrid junction having four terminals, one terminal being connected to said receiver and the conjugate terminal thereof being connected to a dissipative load, and two receiver paths connecting said pair of rotators to the remaining terminals of said second hybrid junction, said receiver paths differing in length by an odd integral multiple of one-quarter wavelength in guide, said rotators being conductive for microwave energy passing through them from said load to said receiver.

4. A microwave radio duplexer in accordance with claim 3 in which said microwave load is a radio space radiator.

5. A microwave radar duplexer comprising, a microwave transmitter, a dissipative resistor, a four-terminal hybrid junction having a shunt arm terminal connected to said transmitter and a conjugate series arm terminal connected to said resistor, first and second magnetic rotation duplexers, a first microwave guide path connecting a third terminal of said hybrid junction to said first duplexer, a second microwave guide path connecting the fourth terminal of said hybrid junction to said second duplexer, said second guide path being longer than said first guide path by an odd integral multiple of one-quarter wavelength in guide, a radar antenna, a three-terminal junction having a shunt arm terminal connected to said antenna, a third microwave guide path connecting said first duplexer to a second terminal of said junction, a fourth microwave guide path connecting said second duplexer to the third terminal of said junction, said third path being longer than said fourth path by the same odd integral multiple of one-quarter wavelength in guide as said second path is longer than said first path, said first and second duplexers being conductive of energy in the direction from said transmitter to said radar antenna, a microwave receiver, a second dissipative resistor, a second four-terminal hybrid junction having a shunt arm terminal connected to said receiver and a conjugate series arm terminal connected to said second dissipative resistor, a fifth microwave guide path connecting said first rotator to a third terminal of said second hybrid junction, and a sixth microwave guide path connecting said second rotator to the fourth terminal of said second hybrid junction, said sixth path being longer than said fifth path by the same odd integral multiple of one-quarter wavelength in guide as said third path is longer than said fourth path, said first and second duplexers being conductive of energy in the direction from said radar antenna to said receiver.

References Cited in the file of this patent

UNITED STATES PATENTS 2,644,930    Luhrs _____ July 7, 1953